United States Patent [19]

Duke

[11] Patent Number: 4,650,146

[45] Date of Patent: Mar. 17, 1987

[54] SURF FISHING ROD HOLDER

[76] Inventor: Ned E. Duke, 5522 Geddes Rd., Ann Arbor, Mich. 48104

[21] Appl. No.: 657,669

[22] Filed: Oct. 4, 1984

[51] Int. Cl.$^4$ ............................................. F16M 13/00
[52] U.S. Cl. ........................................ 248/512; 43/21.2; 248/129; 248/514; 248/518; 248/530; 248/533
[58] Field of Search ............... 248/533, 129, 530, 545, 248/532, 558, 512, 513, 514, 518, 156; 211/70.8; 43/21.2, 23, 18.1, 57.2

[56] References Cited

U.S. PATENT DOCUMENTS

| | | | |
|---|---|---|---|
| D. 239,015 | 3/1976 | Stout | D33/5 |
| 2,311,823 | 2/1943 | Gaskill, Sr. | 248/42 |
| 2,787,431 | 4/1957 | Smith | 248/514 |
| 2,818,271 | 12/1957 | Saeli | 248/129 X |
| 2,862,508 | 1/1958 | Morgan | 43/17 |
| 2,877,828 | 3/1959 | Barnette, Jr. | 248/533 |
| 2,895,682 | 7/1959 | Tavone | 248/411 X |
| 3,058,251 | 10/1962 | Broosk | 43/17 |
| 3,060,614 | 10/1962 | Prince | 43/6.5 |
| 3,074,197 | 1/1963 | Schnars | 43/21.2 X |
| 3,074,674 | 1/1963 | Hill | 248/514 X |
| 3,213,564 | 10/1965 | Borell | 43/57.2 |
| 3,411,231 | 11/1968 | Philbrick | 43/21.2 |
| 3,560,980 | 2/1971 | Fleeman | 340/421 |
| 3,603,019 | 9/1971 | Smeltzer | 43/21.2 |
| 3,659,369 | 5/1972 | Hermanson | 43/21.2 |
| 3,772,816 | 11/1973 | Ridge | 43/21.2 |
| 3,831,891 | 8/1974 | Jester | 248/545 X |
| 3,902,269 | 9/1975 | Dunlap | 43/21.2 |
| 3,906,653 | 9/1975 | Williams | 43/21.2 |
| 4,106,811 | 8/1978 | Hernandez | 297/193 |
| 4,166,505 | 12/1979 | Chon | 43/21.2 |
| 4,197,803 | 6/1979 | Mack | 248/512 |
| 4,261,128 | 4/1981 | Dobbins | 43/21.2 |
| 4,372,072 | 2/1983 | Comceau | 43/21.2 |
| 4,407,089 | 10/1983 | Miller | 43/21.2 |

FOREIGN PATENT DOCUMENTS 15991 of 1893 United Kingdom ............... 248/533

Primary Examiner—J. Franklin Foss
Assistant Examiner—David L. Talbott
Attorney, Agent, or Firm—Harness, Dickey and Pierce

[57] ABSTRACT

A device for supporting at least one surf fishing rod at an appropriate angle for fishing to alleviate the need for the person fishing to hold the fishing rod while fishing. The device is adjustable to allow the fisherman to adjust the direction of the rod or rods. The height of the device is adjustable for the convenience of the person fishing. An additional rod support means is provided to facilitate rod preparation. The entire device is constructed to be water-tight and contains a flotation insert to prevent the device from sinking in water. In an additional embodiment, the fishing rod holder may be used as a handle for a bait bucket fitted with wheels.

8 Claims, 5 Drawing Figures

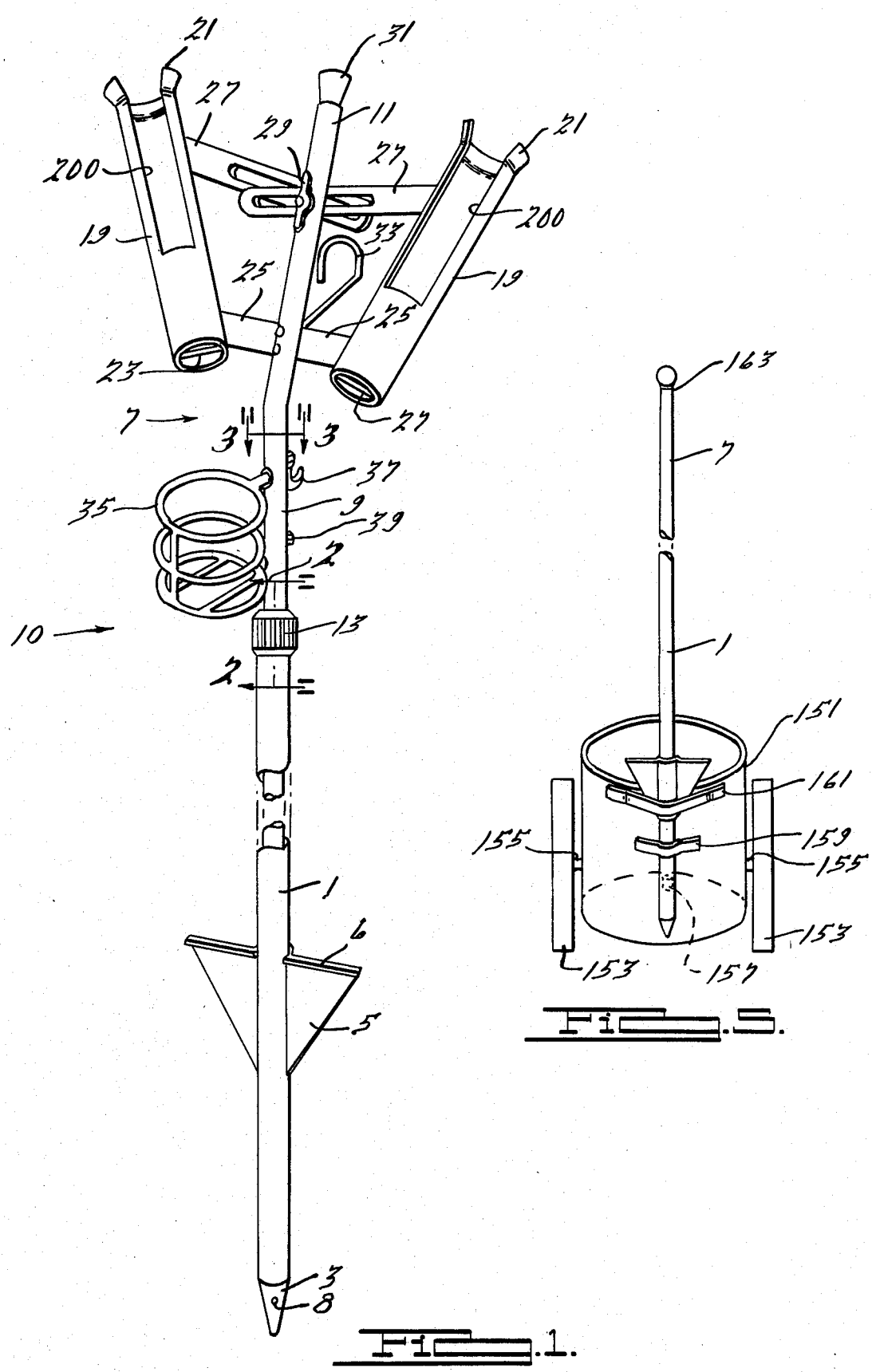

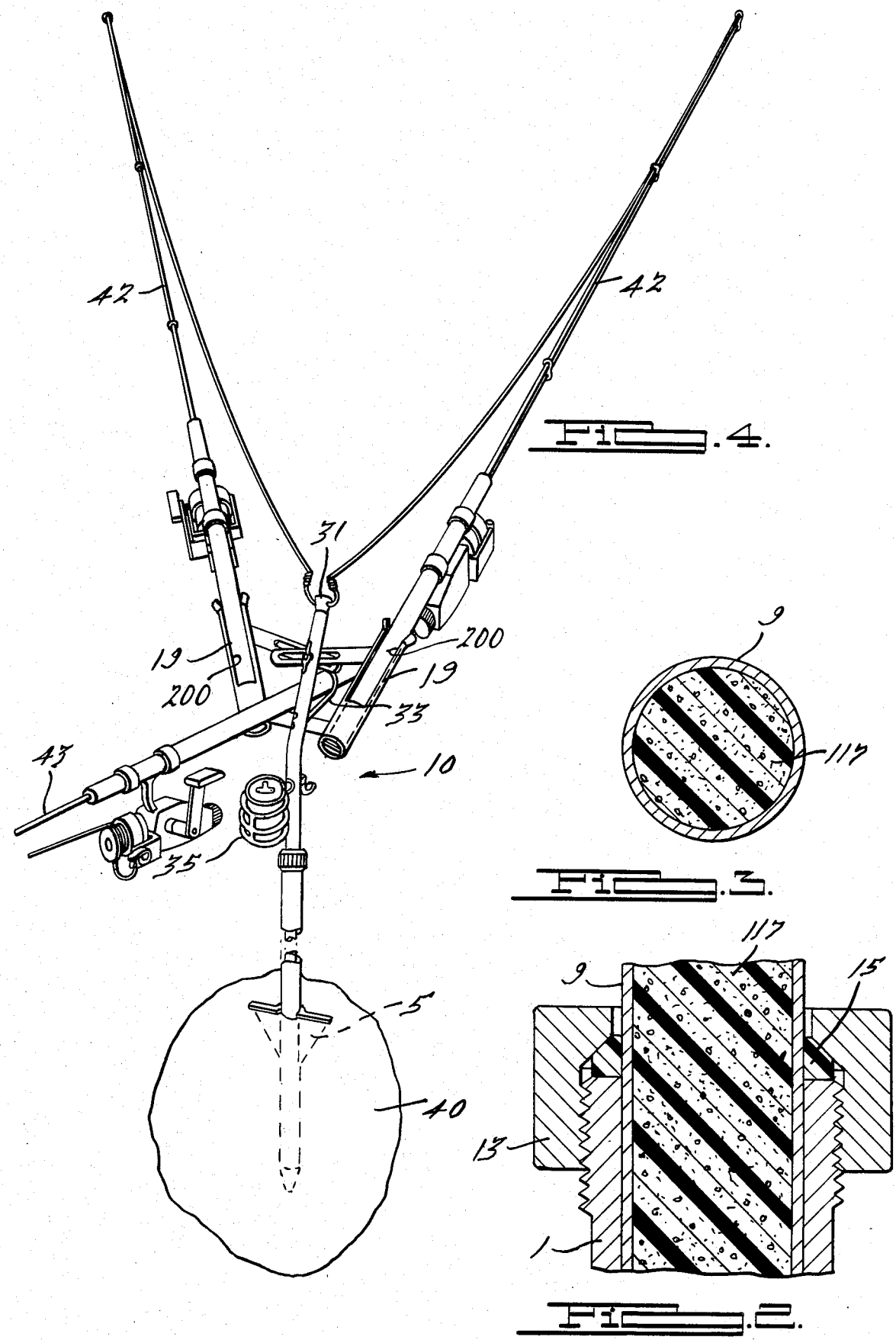

SURF FISHING ROD HOLDER

BACKGROUND AND SUMMARY OF THE INVENTION

Surf fishing is a sport distinct from all other types of fishing. Perhaps the single most distinguishing factor is that surf fishing is always conducted along a shoreline. Whether the coast is that of a lake, ocean, sea, bay, gulf, inlet, river, stream or pond, there is an environment created by the interface of water and land. The object of the present invention is to allow a fisherman to cast his line into the surf, place the pole into the rod holder and leave his hands free for other pursuits, primarily the enjoyment of the surroundings.

Considering the relative awkwardness incumbent when dealing with one or more fishing rods, it is an additional objective of this invention to provide a convenient and safe means for using more than one rod at a time while fishing. Another objective is to provide means for conveniently and safely preparing a rod for fishing, even if another rod is being supported in a fishing position.

Since conditions on the shore may vary between fishing excursions, a further objective of the invention is to provide means for the rod or rods being supported to be adjusted. The rod or rods could thusly be adjusted upon a change in conditions that vary with time, such as wind or the tide, without disrupting the orientation of the rod holder itself. Similarly, the adjustable means would allow greater flexibility in selecting the initial orientation of the rod holder as the orientation of rod or rods may be adjusted to avoid more permanent hazards such as trees, rocks, other fishing rods or fishing lines, piers, docks or other such obstructions.

A particular advantage of this invention is its relative compactness and the convenience of its use. Its telescoping capabilities enable a person fishing to adjust the height of the rod holder in use to nearly twice its height when stored. This capability also gives the person fishing a wide range of usable heights in setting up the rod holder. Versatility, portability and minimum storage requirements are particular objectives of the invention.

A further embodiment is to provide a surf fishing rod holder that will not sink so that the rod holder may be recovered should it fall into the water.

A further objective of the invention is to provide a compact bait bucket fishing rod holder assembly such that the fishing rod holder may be used as the handle for the bait bucket. In this particular embodiment, the person fishing is spared a great deal of the inconvenience of transporting the equipment necessary to fully enjoy the experience. The combination of the rod holder and bait bucket allows the most cumbersome piece of equipment, the bait bucket, to be transported in a very convenient manner and utilizes another potentially awkward piece of equipment, the rod holder, as a useful component of a transportation system. The configuration of the rod holder is particularly suited for use as a handle which is long enough for a person to comfortably push the bait bucket on the wheel arrangement provided.

DETAILED DESCRIPTION OF THE DRAWINGS

FIG. 1 is a perspective view of the fishing rod holder;

FIG. 2 is a cross-sectional view of the fishing rod holder in FIG. 1 taken across the section 2—2, illustrating the compression collar;

FIG. 3 is a cross-sectional view of the fishing rod holder in FIG. 1 taken across the section 3—3, illustrating flotation means;

FIG. 4 is a perspective view of the fishing rod holder supporting two fishing rods in a fishing position and a third fishing rod in a preparatory position; and FIG. 5 is a perspective drawing of the fishing rod holder in combination with a bait bucket.

DETAILED DESCRIPTION OF THE PREFERRED EMBODIMENTS

The drawings show merely exemplary embodiments of the preferred invention for purposes of illustration only. One skilled in the art will readily recognize that the principles of the invention are well adapted for application to devices other than rod holders as well as to fishing rod holders other than those shown in the drawings.

FIG. 1 illustrates the invention that is to be used in surf fishing. A tubular stand shown generally at 10 is implanted in the sand or ground. The stand shown generally at 10 comprises a lower member of the stand 1 and an upper member shown generally at 7. The lower member 1 has a pointed tip 3 so that the stand may be implanted in the ground. The tip 3 has a solid point and may be held in place by a roll pin 8. The tip 3 is tightly fitted onto the lower member 1 so that water cannot leak into the lower member. A triangular implanting blade 5 is welded to the lower member 1 at a point above the pointed tip 3 to stabilize the stand 10 once implanted in the ground. The implanting blade 5 has a lip 6 which is substantially perpendicular to the stand 10 and the plate 5 and which is wide enough to allow a person to use one's foot to aid implantation of the stand 10. The implanting blade 5 is configured to have a shaft so that it may fit over the outer circumference of the lower member 10, providing for a stronger weld and a more sturdy arrangement. The implanting blade, when properly implanted, also provides stability for the entire rod holder assembly. As most of the displacing forces would tend to occur perpendicular to the shoreline, i.e., tensile forces on the fishing line by fish or forces applied by the person fishing, the blade should be implanted parallel to the shore so that it is perpendicular to typically occurring forces. Although the rod holder is constructed to minimize the effects of wind loads, implanting the blade parallel to the shoreline would also tend to support the rod holder in windy conditions.

The upper member 7 is comprised of a first portion 9 and a second portion 11. The first portion 9 is coaxial with the lower member 1 and the second portion 11 is angulated with respect to that axis. The lower member 1 is threaded for a compression collar 13, and is preferably made from one inch diameter anodized aluminum tube. The upper member 7 has a smaller outer diameter than the inner diameter of the lower member 1, and is preferably made from a seven-eighths inch diameter anodized aluminum tube. The upper member 7 is inserted in and carried by the lower member 1 and is adjustably held there by the compression collar 13. In manufacture, the upper member 7 is cut to length from aluminum tubing, five holes are located and drilled therein and the tube is then bent to a fifteen degree bend to form the first and second portions, 9 and 11.

The length of the upper and lower members is selected for maximum convenience to the person fishing. The entire rod holder assembly, when in its most compact arrangement, should easily fit into the trunk or hatch of an automobile and is highly portable. In this compact arrangement, nearly the entire first portion 9 of the upper member 7 will be carried inside the lower member 1. Therefore, the lower member 1 and the first portion 9 of the uper member 7 may be of similar lengths. In use therefore, the rod holder may be expanded to nearly twice the length of its compact arrangement by telescoping the upper member 7 out of the lower member 1 such that only enough of the first portion 9 of the upper member 7 is carried in the lower member 1 to securely support the rod holder and fishing rods in use. This range of telescoping length allows the person fishing to adjust the rod holder for nearly any desired height. The rod holder can be adjusted to accommodate a person fishing while sitting or while standing. In a preferred embodiment, annular teflon washers are provided inside the lower member 1 to facilitate the telescoping adjustment of the rod holder 10.

The compression collar 13 is shown in cross-section in FIG. 2. As the collar 13 is tightened by screwing the collar down, an annular member 15 is deformed, causing the annular member to be compressed against the first portion 9 of the upper member 7 and frictionally securing the upper member in place. The annular member 15, preferably made from a highly deformable plastic, is configured so that it provides a water-tight seal between the upper and lower members even when the compression collar is not tightened but so that the upper member may be slid inside the lower member.

The entire rod holder assembly is constructed so that it is substantially water-tight. The lower member 1 is sealed by the annular member 15 in the compression collar 13 and by the pointed tip 3. The upper member 7 is provided with a water-resistant flotation insert 117, preferably a low density foam material. The flotation insert 117, shown cross-section in FIG. 3, substantially fills the entire length of the upper member 7. The flotation insert 117 provides a buoyancy force which would add to the buoyancy force of the water-tight hollow lower member and would tend to prevent the entire fishing rod holder assembly from sinking.

Again referring to FIG. 1, the rod holder is constructed so as to be able to support one or two rods in a fishing position. The upper member 7 is angulated to provide a second portion 11 from which the fishing rods are supported. An angle of 15° has been found to provide the best orientation for the fishing rods and is preferred. Rod end receptacles 19 are provided so that the butt-ends of fishing rods may insertably be held in place. The rod end receptacles 19 are essentially tubular to receive the rod ends and have flared ends 21 to facilitate the insertion of the fishing rods. The depth of insertion of the fishing rods is limited by rod support members 23, which support the butt-end of the fishing rods being held while allowing water to drain through. Receptacles 19 are each provided with longitudinal cutouts 200 along the uppermost part thereof, through which the butt end of the rod can be quickly inserted or removed. The cutout 200 thus provides the means for quickly removing the fishing rod from the rod holder, to allow the fisherman to quickly set the hook when a strike is detected. The rod end receptacles 19 are attached to the second portion 11 of the upper member 7 by two bracket means. First, the rod end receptacles 19 are pivotally connected to support brackets 25, preferably by rivets, which are fixedly attached to the second portion 11, preferably by a bolt and nut. Second, the rod end receptacles are pivotally connected to adjustable brackets 27, again preferably by rivets, which are frictionally connected to the second portion 11, preferably by a wing nut assembly 29, which wing nut could be on either side of the adjustable bracket. The rod end receptacles are adjustable by sliding the adjustable brackets, which are slotted to provide such motion, with the result that the angles of the fishing rods are adjusted. Each of the fishing rods may be adjusted individually to compensate for changing conditions or to originally avoid existing conditions such as trees, rocks or other fishing rods or lines.

Also illustrated in FIG. 1 is a horizontal rod stand 33, connected to the upper portion 11, which serves as a "third hand" for the person fishing. The horizontal rod stand 33 allows a person to insert a fishing rod into the rod holder 10 such that it is held by the horizontal rod stand in a position suitable for preparing the rod for fishing. The horizontal rod stand preferably shaped like an inverted "u" so that the rod need not be inserted through the horizontal rod stand, but may instead by inserted along side the horizontal rod stand and looped under the horizontal rod stand and into the opening of the inverted "u". In this embodiment, the support bracket 25 on the same side of the upper member 7 as the "u" of the horizontal rod stand 33 also serves as a support for the rod being held in a preparation position. Thusly, a substantial portion of the rod being held may be inserted through the rod holder so that less of the rod need extend toward the body of the person preparing the rod. The end of the horizontal rod stand connected to the second portion 11 may be threaded so that it may serve as a bolt securing both itself and the support brackets 11 to the upper member 9.

A number of features may be included in the manufacture of the fishing rod holder for the convenience of the person fishing. A cork 31 may be inserted into the topmost end of the upper portion of the rod holder. This cork may be used to hold hooks and lures, particularly those on the lines of rods being held but not used, in a safe, yet convenient manner by imbedding the pointed portion of the hook into the cork. The cork also serves to plug the open end of the upper member 7 so that it is water-tight. A beverage can holder 35 may be attached to the first portion 9 of the upper member 7 by inserted standard threaded cylindrical portions through holes drilled in the first portion 9. The preferred beverage holder is comprised of three vertically spaced annular rings, connected by one vertical strip, the lowest annular ring having two strips to support a beverage container. Thusly, the beverage holder achieves the objective of having low wind resistance and being able to allow water to drain through. The beverage holder 35 is then held in place by corresponding nuts 39. In place of a nut, a hook with interior threads 37 may be used. The hook 37 could thereby be used as a utility hook for coats, bait cans or the like.

FIG. 4 illustrates the invention in use. The rod holder 10 has been implanted into the ground or sand, shown at 40. When properly implanted, the implanting blade 5 stabilizes the entire rod holder from potential rotational motion or motion relative to the direction toward the water. The beverage holder 35 is shown providing a secure and convenient resting place for a can of a beverage of the fisherman's choice. Two rods 42 are shown supported in a fishing position by the rod end receptacles 19. Since the lines of the rods 42 are not in the water, the lines are secured to the rod holder by inserting the points of the hooks on the lines into the cork 31. Another rod 43 is supported by the horizontal rod stand 33 in a position suitable for preparing the rod. The position of the rod is for illustrative purposes only, as it would typically be more practical to insert the rod farther through the rod holder so that it would not extend so far toward the person fishing.

Another embodiment of the invention is illustrated in FIG. 5. The invention comprises the use of the fishing rod holder in conjunction with a bait bucket that is capable of being wheeled. The bait bucket 151 may be of any conventional configuration and may be made out of any conventional materials. The bucket shown in FIG. 2 is generally cylindrical in shape. The wheels 153 are attached to the bucket in a conventional means. In FIG. 2, the means for attaching the wheels 153 to the bait bucket 151 is a conventional axle 155. A short metallic leg 157 has been provided to allow the bait bucket to be placed in a stable position. So that the bucket may be placed in such a stable position, it is preferred that the wheels be mounted slightly off center away from the point at which the metallic leg 157 is attached. Mounting brackets 159 and 161 are provided so that the fishing rod holder may be inserted and thusly attached to the bait bucket, mounting bracket 161 being configured to receive the implanting blade 5 and thusly restrict the rotation of the rod holder when used as a handle. The brackets are located at a point along the circumference of the bucket opposite from the metallic leg 157. Such a configuration allows the bait bucket to be tilted toward the brackets whereby the fishing rod holder may be used as a handle as the bait bucket is wheeled. The configuration of the fishing rod holder is such that the top end 163 of the upper member 7 is capable of being used as a convenient handgrip to the handle of the bait bucket and rod holder combination.

While the preferred embodiments of the invention have been illustrated and described in detail, it will be apparent that various modifications as to details of construction and design may be made without departing from the spirit of the invention or the scope of the following claims.

What is claimed is:

1. A fishing rod holder comprising:
   an elongated tubular stand having an upper portion and a lower portion, said lower portion defining a first axis and being tapered for implanting into ground;
   a support bracket means connected to the upper portion of said tubular stand;
   a pair of rod receptacles pivotally connected to said support bracket means, each receptacle having a longitudinal axis which is angulated with respect to said first axis to hold a fishing rod in an upwardly and outwardly directed fishing position;
   each of said rod end receptacles being pivotal for lateral side-to-side adjustment of said receptacles in order to alter the angle between the respective longitudinal axes;
   a rigging fixture connected to said tubular stand, said rigging fixture having at least two points of support for holding a fishing rod in a substantially horizontal inwardly directed rigging position;
   one of said points of support providing a stop against upward movement of a fishing rod in said rigging position; and
   a second one of said points of support being disposed inwardly of said one of said points of support and providing a stop against downward movement of a fishing rod in said rigging position.

2. The fishing rod holder defined in claim 1 further comprising:
   flotation means disposed within and substantially filling said elongated tubular stand for provided a buoyancy force tending to keep said rod holder from sinking.

3. The fishing rod holder defined in claim 1 wherein:
   said lower portion comprises an upper member and a hollow lower member, the outer diameter of said upper member being less than the inner diameter of said lower member, said upper member being telescopingly carried within said lower member; and
   said lower portion carries means for joining said upper and lower members, said means for joining said upper and lower members being adjustable to selectively permit or inhibit relative telescoping motion of said upper and lower members.

4. The fishing rod holder defined in claim 3 wherein:
   said means for joining said upper and lower members comprises a compression collar, said collar having a deformable annular insert for inhibiting said telescoping motion when deformed by said collar.

5. The fishing rod holder defined in claim 3 further comprising:
   flotation means disposed within and substantially filling said upper portion and said upper member for providing a buoyancy force tending to keep said rod holder from sinking.

6. The fishing rod holder defined in claim 1 further comprising:
   an implanting blade disposed on said first tubular member and substantially coplanar with said first axis, said blade having a lip substantially perpendicular to the plane of said blade for transmitting implanting forces to said blade.

7. The fishing rod holder defined in claim 1 wherein said rigging fixture includes:
   a rod hook disposed on said second portion coplanar with said second portion and substantially perpendicular to said first axis, said rod hook having a connecting portion and a receiving portion, said receiving portion being configured to restrain upward movement of a fishing rod when rested on said support bracket means, and said connecting portion being cylindrical and threaded at the end opposite said receiving portion for connecting said rod hook to said second portion.

8. The fishing rod holder of claim 1 further comprising:
   a bucket, at least two wheels, means for connecting said wheels to said bucket, a member for supporting said bucket in a stationary and upright position, means for connecting said supporting member to said bucket, and a bracket means for slidably connecting said rod holder to said bucket generally perpendicular to the plane of the top of the bucket.

* * * * *